United States Patent
Leimkuehler et al.

(10) Patent No.: US 9,395,123 B1
(45) Date of Patent: Jul. 19, 2016

(54) COOLING SYSTEMS

(71) Applicant: Paragon Space Development Corporation, Tucson, AZ (US)

(72) Inventors: Thomas Orville Leimkuehler, League City, TX (US); Thomas William Morin, Vail, AZ (US); Grant A. Anderson, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 428 days.

(21) Appl. No.: 13/730,136

(22) Filed: Dec. 28, 2012

Related U.S. Application Data

(63) Continuation-in-part of application No. 12/826,627, filed on Jun. 29, 2010, now Pat. No. 8,342,454.

(60) Provisional application No. 61/221,531, filed on Jun. 29, 2009.

(51) Int. Cl.
   *F28D 15/00* (2006.01)

(52) U.S. Cl.
   CPC ..................................... *F28D 15/00* (2013.01)

(58) Field of Classification Search
   CPC ....... F25D 3/08; F25D 11/006; F25D 31/006; F25D 15/00; B64G 1/50; B64G 6/00; B64G 1/62; B64G 1/58
   USPC ............ 165/10, 135, 104.17, 104.15; 62/425, 62/457.2, 459
   See application file for complete search history.

(56) References Cited

U.S. PATENT DOCUMENTS

| | | | | |
|---|---|---|---|---|
| 2,285,149 A | * | 6/1942 | Arcey | 62/73 |
| 3,802,220 A | * | 4/1974 | Pompo | 62/530 |
| 3,940,249 A | * | 2/1976 | McClurg | 436/174 |
| 4,790,141 A | * | 12/1988 | Glascock | 62/78 |
| 5,058,397 A | * | 10/1991 | MacDonald | 62/457.2 |
| 5,689,970 A | * | 11/1997 | Chopas | 62/372 |
| 6,015,065 A | | 1/2000 | McAlister | |
| 6,183,855 B1 | | 2/2001 | Buckley | |

(Continued)

FOREIGN PATENT DOCUMENTS

WO    WO2005043619 A1    5/2005

OTHER PUBLICATIONS

Leimkuehler, T. O., Powers, A., Linrud, C., Bower, C., and Bue, G. "*Demonstration of Super Cooled Ice as a Phase Change Material Heat Sink for Portable Life Support Systems*," SAE Paper 2009-01-2405, 39th International Conference on Environmental Systems (ICES), Savannah, GA, Jul. 2009.

(Continued)

*Primary Examiner* — Tho V Duong
*Assistant Examiner* — Raheena Rehman
(74) *Attorney, Agent, or Firm* — Weaver Austin Villeneuve & Sampson, LLP

(57) ABSTRACT

A portable thermal-control system adapted to support space-related research and exploration. Embodiments of the present invention assist in preventing overheating of small payloads being transported from an orbiting space vehicle to a planetary surface by small atmospheric-entry vehicles. Other embodiments of the present invention provide thermal control within an extra-vehicular activity (EVA) suit. Each embodiment utilizes at least one phase-change material, cooled significantly below the freezing temperature, to absorb heat.

13 Claims, 9 Drawing Sheets

(56) References Cited

U.S. PATENT DOCUMENTS

| | | |
|---|---|---|
| 6,192,703 B1 | 2/2001 | Salyer et al. |
| 6,247,328 B1 * | 6/2001 | Mogil ............... 62/457.2 |
| 6,253,570 B1 * | 7/2001 | Lustig ............... 62/457.2 |
| 6,361,746 B1 * | 3/2002 | Wlodarski ............ 422/561 |
| 6,718,776 B2 | 4/2004 | Wessling et al. |
| 6,780,505 B1 | 8/2004 | Klett et al. |
| 6,782,196 B1 | 8/2004 | Kuebler et al. |
| 6,925,834 B2 * | 8/2005 | Fuchs ............... 62/457.2 |
| 7,070,755 B2 | 7/2006 | Klett et al. |
| 7,166,237 B2 | 1/2007 | Klett et al. |
| 7,257,963 B2 | 8/2007 | Mayer |
| 7,416,017 B2 | 8/2008 | Haws et al. |
| 2003/0010041 A1 | 1/2003 | Wessling et al. |
| 2003/0202306 A1 | 10/2003 | Dubhashi |
| 2005/0227037 A1 | 10/2005 | Booska et al. |
| 2005/0247432 A1 * | 11/2005 | Bhatti et al. ......... 165/80.3 |
| 2006/0191282 A1 * | 8/2006 | Sekiya et al. ......... 62/371 |

OTHER PUBLICATIONS

Zuniga, D., Murbach, M. A., Leimkuehler, T. O., Leidich, J., and Chiesi, S. S., "*Conceptual Development of a Payload Thermal and Pressure Control System for a Small Payload Quick Return Vehicle,*" AIAA-2010-6222, 40th International Conference on Environmental Systems (ICES), Barcelona, Spain, Jul. 2010.

Leidich, J., Leimkuehler, T. O., Chiesi, S. S., and Murbach, M. S., "*Developing and Testing a Spacecraft Phase Change Material Container for Water Ice Using Resilient Compressible Foam,*" AIAA-2011-5210, 41st International Conference on Environmental Systems (ICES), Portland, OR, Jul. 2011.

\* cited by examiner

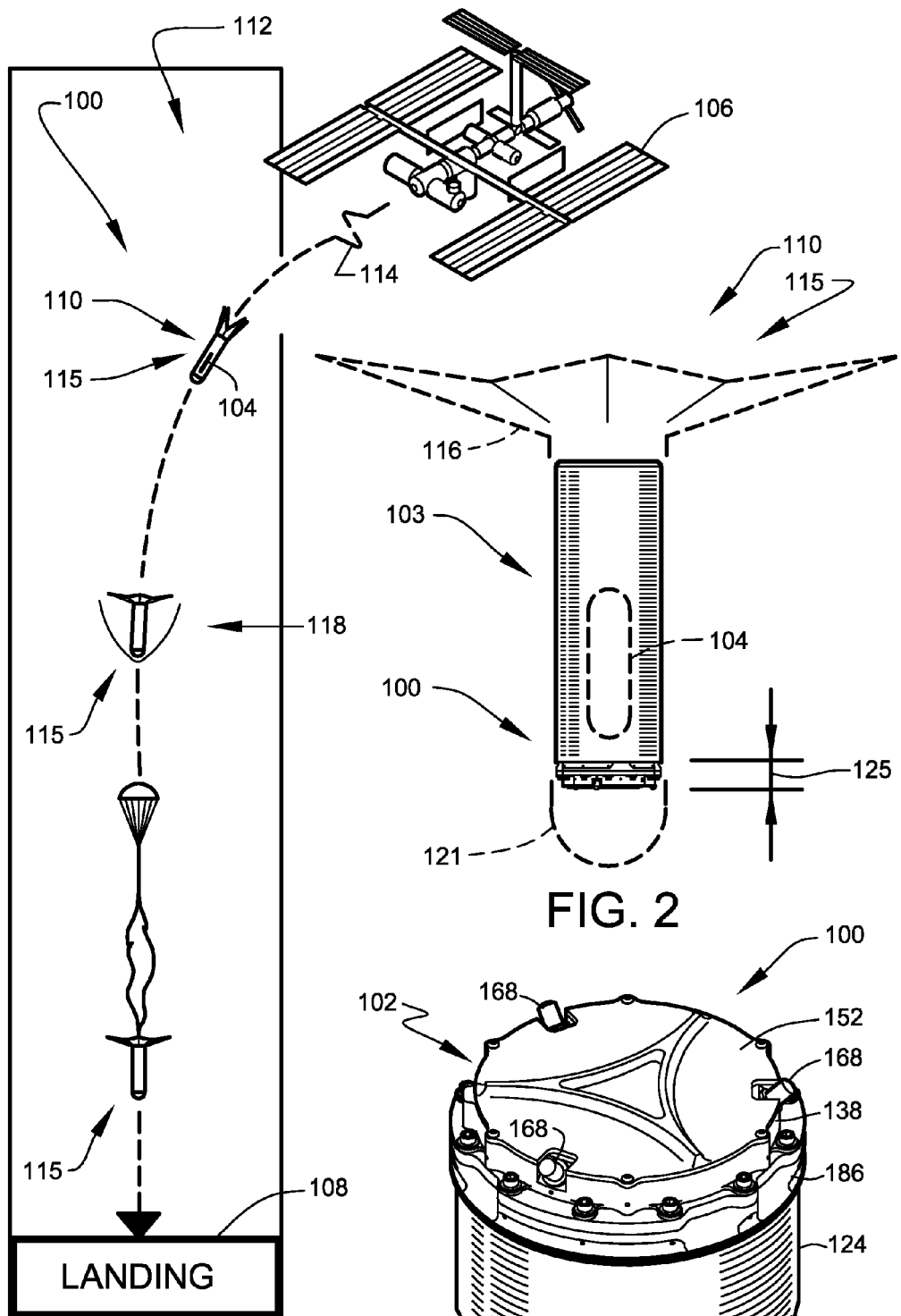

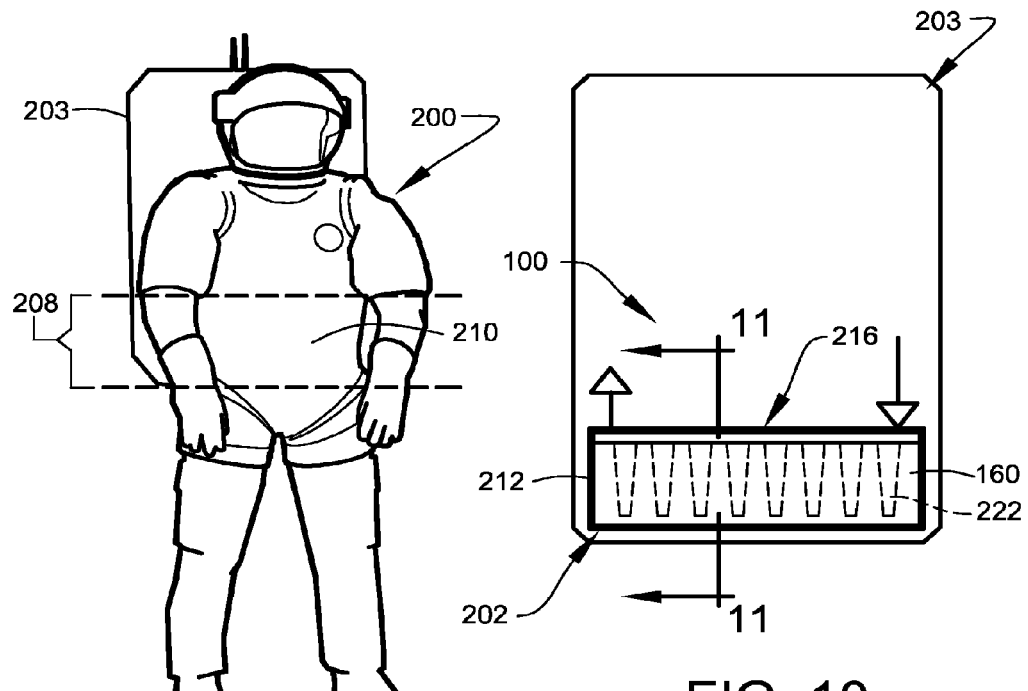
FIG. 9
FIG. 10
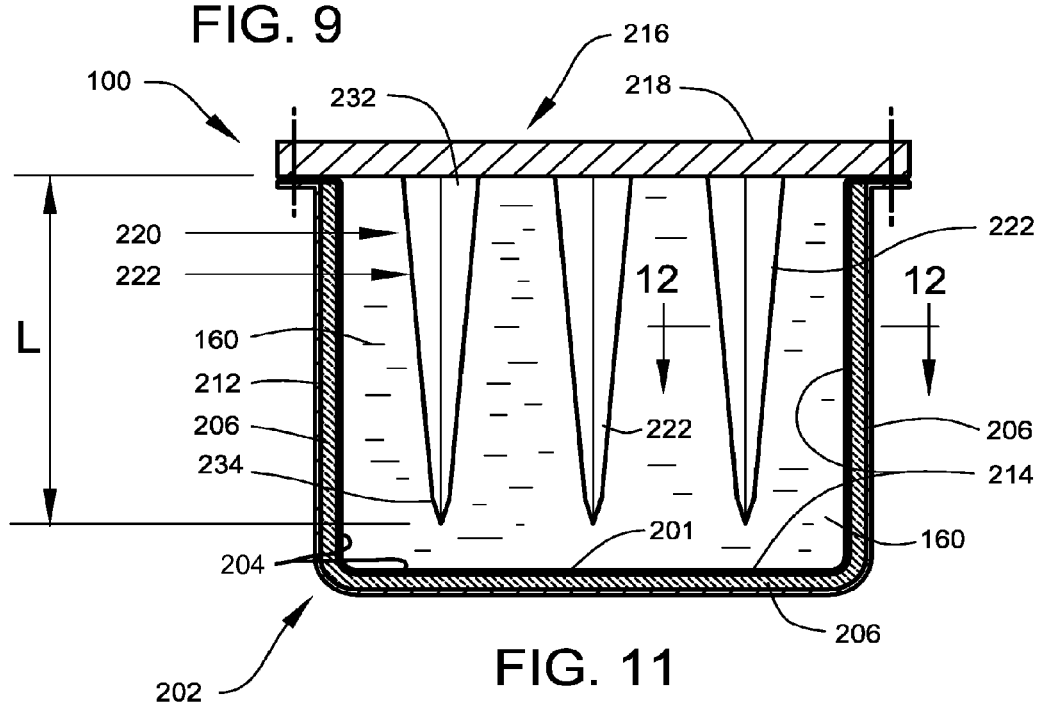
FIG. 11

COOLING SYSTEMS

CROSS-REFERENCE TO RELATED APPLICATION

The present application is a continuation-in-part and is related to and claims priority from application Ser. No. 12/826,627, filed Jun. 29, 2010, entitled "COOLING SYSTEMS", which application is related to and claims priority from prior provisional application Ser. No. 61/221,531, filed Jun. 29, 2009, entitled "COOLING SYSTEMS", the contents of which is incorporated herein by this reference and is not admitted to be prior art with respect to the present invention by the mention in this cross-reference section.

STATEMENT REGARDING FEDERALLY SPONSORED RESEARCH OR DEVELOPMENT

Some embodiments of this invention may have been developed with United States Government support under Contract No. NNX08CC35P and Contract No. NNX09RA19C awarded by The National Aeronautics and Space Administration. The Government may have certain rights in the invention.

BACKGROUND

This invention relates to cooling systems. More particularly, this invention relates to portable thermal-control systems adapted to support space-related research, space exploration, and operations in thermally-demanding earth environments.

The need for thermal control has been apparent from the beginning of space research and exploration. From the early Gemini program through the interplanetary missions currently in design, thermal-control hardware has existed as a primary subsystem in space-operated technologies. Space vehicles must be engineered to withstand the demanding environment of space, and depending on mission profile, reentry through a planetary atmosphere. Such space vehicles are comprised of an array of components, which operate effectively and reliably only when maintained within specified thermal design limits. Furthermore, space vehicles often function to transport human crew and other thermally-sensitive payload.

The establishment of a long-term space presence is an important human endeavor and represents a significant investment of resources. To maximize the return on such an investment, it is important to develop efficient means for implementing relatively frequent return of scientific materials and other payloads from on-orbit stations to Earth. The development of small down-mass re-entry vehicles, to provide for the quick return of payloads from space, would be one viable solution, if an effective means for thermal control during the return procedure were to exist for such hardware.

Similar technical challenges exist in other space-deployed systems, including, thermal control of extra-vehicular activity (EVA) suits worn during on-orbit operations and during surface missions on other space bodies (for example, the Moon and Mars). Clearly, the development of more efficient portable thermal-control subsystems, especially those adapted to support space-related research, space exploration, and similar applications would be of great benefit to many.

OBJECTS AND FEATURES OF THE INVENTION

A primary object and feature of the present invention is to provide a system overcoming the above-mentioned problems. It is a further object and feature of the present invention to provide such a system that assists in preventing overheating of payloads being transported from an on-orbit deployer to a planetary (or moon) surface by an atmospheric-entry vehicle. It is another object and feature of the present invention to provide such a system adapted to provide thermal control of an EVA suit. It is a further object and feature of the present invention to provide such a system adapted to control thermal environments using latent-heat processes associated with at least one Phase Change Material (PCM). It is another object and feature of the present invention to provide such a system usable to control thermal environments using both sensible-heat process and latent-heat processes provided by at least one PCM cooled to below the material's isothermic phase-change temperature.

It is an additional object and feature of the present invention to provide such a system adapted to use water as the PCM. It is another object and feature of the present invention to provide such a system adapted to control the expansion of a water-based PCM during phase transition of the PCM between a liquid state and solid state. A further primary object and feature of the present invention is to provide such a system that is efficient, cost-effective, and useful. Other objects and features of this invention will become apparent with reference to the following descriptions.

SUMMARY OF THE INVENTION

In accordance with a preferred embodiment hereof, this invention provides a system, relating to assisting preventing overheating of at least one payload being transported from at least one on-orbit deployer to a planetary surface, or other atmosphere-shrouded body, by at least one atmospheric-entry vehicle, comprising: situated within the at least one atmospheric-entry vehicle between at least one payload compartment for the at least one payload and at least one forward atmospheric-entry structure producing atmospheric-entry heat during such atmospheric entry, at least one intermediate structure; wherein such at least one intermediate structure comprises at least one cooling component; wherein such at least one cooling component comprises at least one phase-change material cooled to solid state; wherein such at least one intermediate structure is structured and arranged to assist absorbing the atmospheric entry heat coupled with sensible-heat processes and latent-heat processes; wherein such sensible-heat processes are effected by transition of such at least one phase-change material from at least one sub-phase-change temperature (below 0° C. for water-based materials) to a higher temperature; wherein such latent-heat processes are structured and arranged to be effected by phase transition of such at least one phase-change material from solid-state to liquid-state; and wherein overheating of such at least one payload being transported to the planetary surface, or other atmosphere-shrouded body, by the at least one atmospheric-entry vehicle is assisted to be prevented during such atmospheric entry.

Moreover, it provides such a system wherein such at least one phase-change material comprises substantially water. Additionally, it provides such a system wherein such at least one intermediate structure further comprises: at least one container structured and arranged to contain such at least one cooling component; wherein such at least one container comprises at least one heat-exchanging wall structured and arranged to assist thermal exchange between such at least one phase-change material and at least one thermal environment adjacent such at least one heat-exchanging wall; wherein such at least one cooling component further comprises at least one locator structured and arranged to locate such at least one phase-change material in direct thermal interaction with such at least one heat-exchanging wall; wherein such at least one locator comprises at least one volumetric accommodator structured and arranged to accommodate volumetric changes of such phase-change material during phase transition. Also, it provides such a system wherein such at least one intermediate structure further comprises: at least one forward coupler structured and arranged to assist coupling of such at least one intermediate structure with the at least one forward atmospheric-entry structure; and at least one aft coupler structured and arranged to detachably couple such intermediate structure to at least one open forward end of the at least one payload compartment; wherein such at least one forward coupler comprises at least one thermal isolator structured and arranged to thermally isolate non-coupled portions of such at least one intermediate structure from the atmospheric-entry heat during generated by the at least one forward atmospheric-entry structure during such atmospheric entry; and wherein such at least one aft coupler comprises at least one postioner structured and arranged to assist positioning of such at least one heat-exchanging surface in thermal interaction with at least one thermal environment of the at least one payload compartment.

In addition, it provides such a system wherein such at least one intermediate structure further comprises: at least one aft mating surface structured and arranged to assist forming at least one mated engagement with at least one pressure-retaining seal of the at least one open forward end; wherein such mating of such at least one mating surface with the at least one pressure-retaining seal assists in maintaining generally isobaric pressure levels within the at least one thermal environment of the at least one payload compartment; wherein such at least one aft coupler comprises at least one first plurality of releasable mechanical retainers structured and arranged to assist releasable mechanical retention of such at least one intermediate structure to the at least one open forward end of the at least one payload compartment; and wherein such at least one intermediate structure defines at least one detachable lid structured and arranged to detachably lid the at least one forward open end of the at least one payload compartment. And, it provides such a system wherein such at least one container further comprises: at least one forward open end, at least one closed aft end, and at least one peripheral side wall extending between such at least one forward open end and such at least one closed aft end; at least one removable cover structured and arranged to removably cover such at least one open forward end; and at least one second plurality of releasable mechanical retainers structured and arranged to assist releasable mechanical retention of such at least one removable cover to such at least one forward open end of such at least one container. Further, it provides such a system wherein such at least one closed aft end comprises such at least one heat-exchanging wall.

Even further, it provides such a system wherein such at least one closed aft end further comprises, engaged within such phase-change material, at least one heat transfer fin structured and arranged to provide at least one supplementary pathway of heat transfer between such phase-change material and such at least one heat-exchanging wall. Moreover, it provides such a system wherein: such at least one forward open end comprises at least one peripheral engagement surface structured and arranged to engage such at least one removable cover; and such at least one peripheral engagement surface comprises at least one pressure-retaining seal structured and arranged to form at least one pressure-retaining seal between such at least one forward open end and such at least one removable cover. Additionally, it provides such a system wherein such at least one locator further comprises at least one insulator structured and arranged to reduce a rate of thermal migration of the atmospheric-entry heat across such at least one intermediate structure. Also, it provides such a system wherein such at least one locator comprises at least one foamed elastomeric material.

And, it provides such a system wherein such at least one phase-change material is cooled to comprise an initial temperature of between about −1 degrees Celsius and about −150 degrees Celsius. Further, it provides such a system wherein such at least one cooling component is structured and arranged to contain about one-half pound of such at least one phase-change material. Even further, it provides such a system wherein such first plurality of releasable mechanical retainers and such second plurality of releasable mechanical retainers comprise externally threaded fasteners.

In accordance with another preferred embodiment hereof, this invention provides a system, relating to assisting preventing overheating of at least one payload being transported from space to a planetary surface, or other atmosphere-shrouded body, within at least one payload compartment of at least one atmospheric-entry vehicle, comprising: situated within the at least one atmospheric-entry vehicle between the at least one payload compartment and at least one forward atmospheric-entry structure producing atmospheric-entry heat during such atmospheric entry, at least one payload-compartment lid structured and arranged to lid the at least one payload compartment; wherein such at least one payload-compartment lid comprises at least one cooling component and at least one internal container structured and arranged to contain such at least one cooling component; wherein such at least one cooling component comprises at least one phase-change material cooled to solid state; wherein such at least one payload-compartment lid is structured and arranged to assist absorbing the atmospheric entry heat coupled with sensible-heat processes and latent-heat processes; wherein such sensible-heat processes are effected by transition of such at least one phase-change material from at least one cooled temperature to a higher temperature; wherein such latent-heat processes are structured and arranged to be effected by phase transition of such at least one phase-change material from solid-state to liquid-state; and wherein overheating of such at least one payload being transported to the planetary surface, or other atmosphere-shrouded body, by the at least one atmospheric-entry vehicle is assisted to be prevented during such atmospheric entry.

Moreover, it provides such a system wherein such at least one phase-change material comprises substantially water. Additionally, it provides such a system wherein such at least one internal container comprises: at least one heat-exchanging wall structured and arranged to assist thermal exchange between such at least one phase-change material and at least one thermal environment within the at least one payload compartment; wherein such at least one cooling component further comprises at least one locator structured and arranged to locate such at least one phase-change material in direct thermal interaction with such at least one heat-exchanging wall; wherein such at least one locator comprises at least one elastomeric foam material structured and arranged to accommodate volumetric changes of such phase-change material during phase transition. Also, it provides such a system wherein such at least one payload-compartment lid further comprises: at least one forward coupler structured and arranged to assist coupling of such at least one intermediate structure with the at least one forward atmospheric-entry structure; and at least one aft coupler structured and arranged to detachably couple such at least one payload-compartment lid to at least one open forward end of the at least one payload compartment; wherein such at least one forward coupler comprises at least one thermal isolator structured and arranged to thermally isolate non-coupled portions of such at least one intermediate structure from the atmospheric-entry heat during generated by the at least one forward atmospheric-entry structure during such atmospheric entry; and wherein such at least one aft coupler is structured and arranged to position such at least one heat-exchanging surface in thermal interaction with at least one thermal environment of the at least one payload compartment.

In addition, it provides such a system wherein such at least one payload-compartment lid further comprises: at least one aft mating surface structured and arranged to assist forming at least one mated engagement with at least one pressure-retaining seal of the at least one open forward end; wherein such mating of such at least one mating surface with the at least one pressure-retaining seal assists in maintaining generally isobaric pressure levels within the at least one thermal environment of the at least one payload compartment; and wherein such at least one aft coupler comprises at least one first plurality of threaded retainers structured and arranged to assist threaded retention of such at least one payload-compartment lid to the at least one open forward end of the at least one payload compartment. And, it provides such a system wherein such at least one container further comprises: at least one forward open end, at least one closed aft end, and at least one peripheral side wall extending between such at least one forward open end and such at least one closed aft end; at least one removable cover structured and arranged to removably cover such at least one open forward end; and at least one second plurality of threaded retainers structured and arranged to assist threaded retention of such at least one removable cover to such at least one forward open end. Further, it provides such a system wherein such at least one closed aft end comprises such at least one heat-exchanging wall.

Even further, it provides such a system wherein: such at least one forward open end comprises at least one peripheral engagement surface structured and arranged to engage such at least one removable cover; and such at least one peripheral engagement surface comprises at least one pressure-retaining seal structured and arranged to form at least one pressure-retaining seal between such at least one forward open end and such at least one removable cover.

In accordance with another preferred embodiment hereof, this invention provides a system, relating to providing at least one portable cooling system, comprising: at least one container structured and arranged to contain at least one phase-change material having at least one liquid state and at least one solid state; wherein such at least one container comprises at least one fluid-retaining boundary structured and arranged to retain the at least one phase-change material in the at least one liquid state and the at least one solid state, at least one heat-transfer interface structured and arranged to establish at least one physical interface enabling heat transfer across such at least one fluid-retaining boundary, wherein such at least one heat-transfer interface comprises, structured and arranged to be embedded within multiple locations within the at least one phase-change material, at least one heat-transfer assister structured and arranged to assist heat transfer between the at least one phase-change material and such at least one heat-transfer interface; wherein such at least one heat-transfer assister comprises at least one mechanical disrupter structured and arranged to assist mechanical disruption of crystalline lattices occurring within the at least one phase-change material during at least one phase-change transition from the at least one liquid state to the at least one solid state.

Even further, it provides such a system wherein: such at least one fluid-retaining boundary comprises a plurality of interior surfaces in physical contact with the at least one phase-change material; such at least one heat-transfer assister comprises at least one plurality of projecting fins; each projecting fin of such at least one plurality of projecting fins comprises a plurality of heat-exchanging surfaces, each one structured and arranged to assist exchanges of heat energy between the at least one phase-change material and such projecting fin; wherein each heat-exchanging surface comprises a non-parallel orientation relative to all opposing adjacent interior surfaces of such plurality of interior surfaces and all opposing adjacent heat-exchanging surfaces of such plurality of heat-exchanging surfaces; and such non-parallel orientation of such respective opposing surfaces produces mechanically-disruptive movement of the crystalline lattices occurring within the at least one phase-change material during such at least one phase-change transition from the at least one liquid state to the at least one solid state. Even further, it provides such a system wherein each such projecting fin comprises: at least one proximal end portion joined with such at least one heat-transfer interface, at least one distal end, at least one longitudinal length separating such at least one proximal end and such at least one distal end; and within such at least one longitudinal length, at least one parallelogram-shaped lateral cross-section. Even further, it provides such a system wherein each such projecting fin tapers from such at least one proximal end to such at least one distal end. Even further, it provides such a system further comprising: within such at least one fluid-retaining boundary, at least one expandable fold structured and arranged to assist articulated expansion of portions of such at least one fluid-retaining boundary; wherein volumetric changes of such phase-change material during such phase transition are accommodated by such articulated expansion of such at least one fluid-retaining boundary.

Even further, it provides such a system further comprising: at least one protective outer shell structured and arranged to protectively enclose portions of such at least one fluid-retaining boundary; wherein such at least one outer shell comprises a fixed external volume; and disposed between such portions of such at least one fluid-retaining boundary and such at least one outer shell, at least one resiliently-deformable member structured and arranged to provide at least one region of resiliently-deformable volumetric expansion between such at least one expandable fold and such at least one outer shell. Even further, it provides such a system wherein such at least one resiliently-deformable member comprises at least one compressible foam. Even further, it provides such a system wherein such at least one fluid-retaining boundary comprises at least one flexible polyvinyl fluoride sheet. Even further, it provides such a system further comprising: such at least one phase-change material; wherein such at least one phase-change material comprises substantially water. Even further, it provides such a system wherein such at least one phase-change material comprises at least one cooled temperature below an isothermic phase change temperature of such at least one phase-change material.

In accordance with another preferred embodiment hereof, this invention provides a system, relating to assisting preventing overheating of at least one payload being transported from space to a planetary surface, or other atmosphere-shrouded body, within at least one payload compartment of at least one atmospheric-entry vehicle, comprising: situated within the at least one atmospheric-entry vehicle between the at least one payload compartment and at least one forward atmospheric-entry structure producing atmospheric-entry heat during such atmospheric entry, lid means for lidding the at least one payload compartment; wherein such lid means comprises cooling means for cooling and container means for containing such cooling means; wherein such cooling means comprises at least one phase-change material cooled to solid state; wherein such lid means assists absorbing the atmospheric entry heat coupled with sensible-heat processes and latent-heat processes; wherein such sensible-heat processes are effected by transition of such at least one phase-change material from at least one sub-phase-change temperature to a higher temperature; wherein such latent-heat processes are structured and arranged to be effected by phase transition of such at least one phase-change material from solid-state to liquid-state; and wherein overheating of such at least one payload being transported to the planetary surface, or other atmosphere-shrouded body, by the at least one atmospheric-entry vehicle is assisted to be prevented during such atmospheric entry. In addition, it provides each and every novel feature, element, combination, step and/or method disclosed or suggested by this patent application.

BRIEF DESCRIPTION OF THE DRAWINGS

FIG. 1 shows a schematic diagram, illustrating a payload being transported from an on-orbit deployer to a planetary surface, or other atmosphere-shrouded body, by atmospheric-entry vehicle, according to a preferred application of the present invention.

FIG. 2 shows a side view, diagrammatically illustrating the integration of a Payload Containment and Thermal Control Unit (PCTCU) within the atmospheric entry vehicle, comprising a preferred embodiment of the present invention.

FIG. 3 shows a partial perspective view, of the PCTCU with the outer structures of the atmospheric entry vehicle removed to expose a Thermal Control Unit (TCU), according to a preferred embodiment of the present invention.

FIG. 9 shows an extra-vehicular activity (EVA) suit comprising a portable life support system (PLSS) utilizing an alternate embodiment of the thermal-control system, according to a preferred application of the present invention.

FIG. 10 shows a rear view, diagrammatically illustrating the integration of an alternate Thermal Control Unit (TCU) within the PLSS "pack" of the EVA suit, according to a preferred embodiment of the present invention.

FIG. 11 shows a sectional view, through the section 11-11 of FIG. 10, generally illustrating preferred component arrangements of the TCU, according to the preferred embodiment of FIG. 10.

Figure 4:
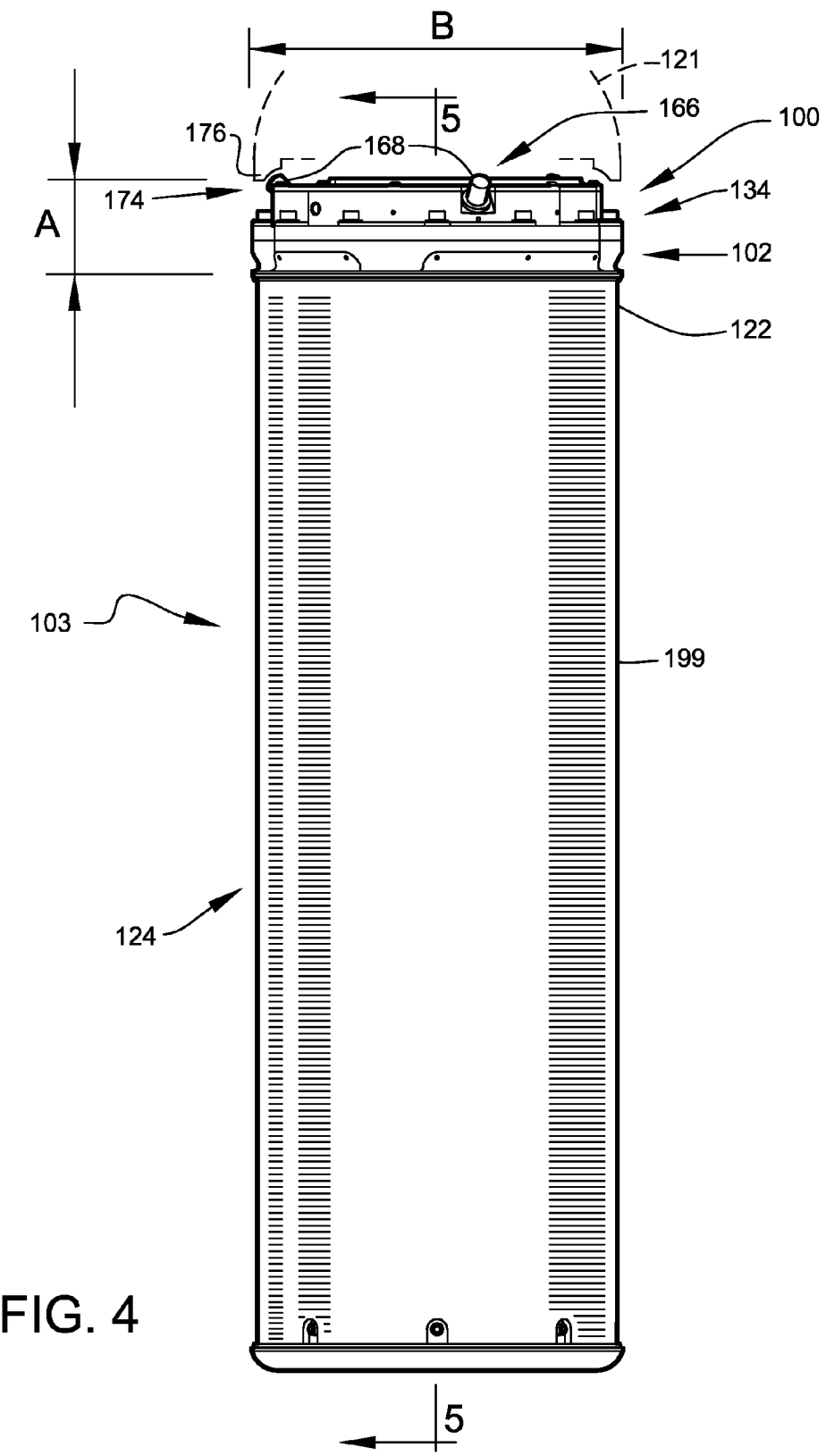
FIG. 4 shows a side elevational view of the TCU, mounted operably to a forward end of a payload compartment of the PCTCU, according to the preferred embodiment of FIG. 2.

DETAILED DESCRIPTION OF THE BEST MODES AND PREFERRED EMBODIMENTS OF THE INVENTION

Thermal-control system 100 comprises a series of system embodiments designed primarily to support thermal control in space-related research and exploration applications. One highly preferred embodiment of the present invention assists in preventing overheating of small payloads transported from an orbiting space vehicle to a planetary surface (or other space body comprising an atmosphere) by a small atmospheric-entry vehicle. Other preferred embodiments of the present invention provide thermal control within an extra-vehicular activity (EVA) suit. Each embodiment of thermal-control system 100 preferably utilizes at least one phase-change material (PCM) to absorb heat. More preferably, each embodiment is preferably configured to utilize at least one PCM to absorb heat through both sensible and latent heat processes. It should be noted that useful applications of the present technology extend beyond space exploration and research, having preferred application in thermally demanding earth-based environments. Secondary useful applications may include thermally-controlled suits for firefighters, cooling of electric vehicle systems, etc.

FIG. 1 shows a schematic diagram, illustrating transport of a payload 104 from an on-orbit deployer 106 to a planetary surface 108 by atmospheric-entry vehicle 110, according to a preferred application of the present invention. FIG. 2 shows a side view, diagrammatically illustrating the integration of a Payload Containment and Thermal Control Unit (hereinafter referred to as PCTCU 103) within atmospheric-entry vehicle 110, according to a preferred embodiment of the present invention. In the present disclosure, the term "planetary" shall be broadly defined to include other celestial bodies comprising enveloping atmospheres, such as, for example dwarf planets, satellites of other planets, small solar system bodies, asteroids, trans-neptunian objects, comets, and other atmosphere-shrouded bodies.

Atmospheric-entry vehicle 110 is preferably designed to routinely return small payloads from on-orbit deployer 106, such as, for example, a space station, or similar orbiting space structure. Such small down-mass systems provide a means for quickly returning materials to Earth, thereby reducing dependence on larger transport systems, which generally operate on infrequent transfer schedules.

PCTCU 103 is preferably designed to maintain the internal payload 104 within specified thermal design limits during an atmospheric return and recovery procedure, as shown. Some of the specific types of payloads supported by the system are refrigerated samples, frozen samples, and cryogenic samples.

In a representative return procedure 112, atmospheric-entry vehicle 110 is deployed from on-orbit deployer 106 and is preferably equipped to perform one or more on-orbit maneuvers 114 to establish an appropriate approach for atmospheric entry. Following the orbital stage, atmospheric-entry vehicle 110 enters atmospheric-entry stage 118, as diagrammatically depicted in FIG. 1.

Proposed configurations of atmospheric-entry vehicle 110 include the use of a Tube Deployed Return Vehicle (identified herein as TDRV 115) having a blunt nose cap 121 in combination with one or more deployable drag structures, which may include a skirt-like flair 116 that unfold during the decent, as shown. TDRV 115 traverses a broad range of Mach numbers during atmospheric entry stage 118 (from approximately 20-Mach at entry to subsonic after about one-hundred-thirty-five seconds). Such atmospheric entry subjects forward atmospheric-entry structures of the vehicle (particularly nose cap 121) to significant heating. Applicant's computer-assisted thermal modeling of TDRV 115 during return procedure 112 identified re-entry stage 118 as the primary heating domain of TDRV 115, with nose cap 121 generating a significant portion the anticipated thermal load.

In final stages of return procedure 112, TDRV 115 is further decelerated by parachute deployment, as shown, or by other landing techniques. On reaching the planetary surface 108, TDRV 115 along with payload 104 are available for recovery. Under appropriate circumstances, PCTCU 103, preferably including TCU 102, may be reconditioned for reuse. Furthermore, upon reading this specification, those with ordinary skill in the art will now appreciate that, under appropriate circumstances, considering such issues as field of operation, science objectives, advances in vehicle technology, etc., other mission profiles such as, for example, utilizing a TDRV/PCTCU-based system to deploy a surface-conducted experiment from orbit, utilizing a direct (non-orbital) entry approach, utilizing other vehicle configurations, etc., may suffice.

PCTCU 103 preferably comprises at least one self-contained cooling component, most preferably in the form of a demountable Thermal Control Unit (hereinafter referred to as TCU 102). TCU 102 is preferably situated within atmospheric-entry vehicle 110 in intermediate position 125 between payload compartment 120 (containing payload 104) and nose cap 121, as shown in FIG. 1. This preferred intermediate position places TCU 102 (at least embodying herein such at least one intermediate structure) between payload 104 and the forward atmospheric-entry structures identified in Applicant's thermal studies to be primary contributors of atmospheric-entry heat during return procedure 112. In the present disclosure, nose cap 121 at least embodies herein at least one forward atmospheric-entry structure producing atmospheric-entry heat during such atmospheric entry.

Figure 5:
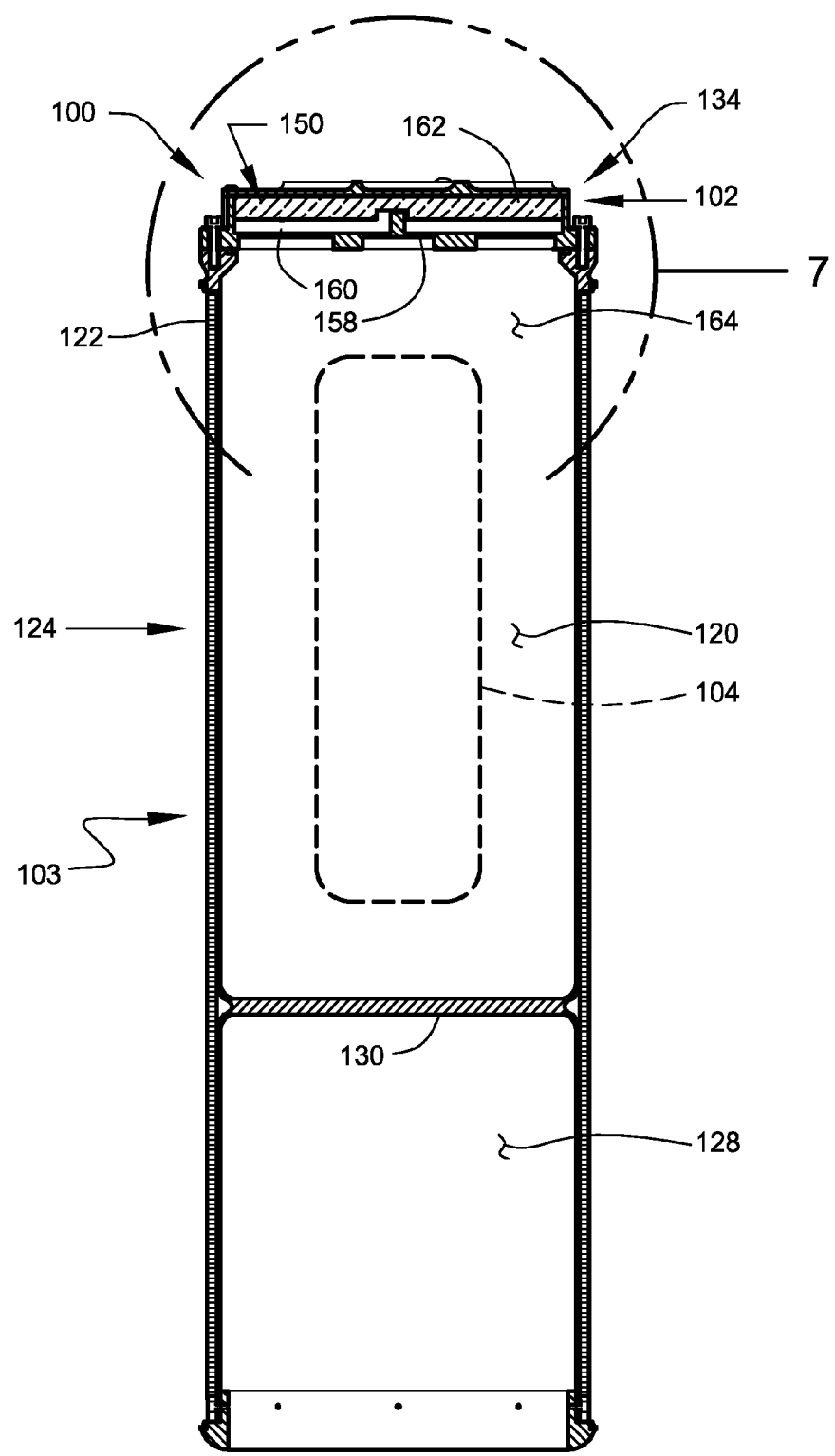
FIG. 5 shows a sectional view, through the section 5-5 of FIG. 4, generally illustrating preferred component arrangements of the PCTCU, according to the preferred embodiment of FIG. 2.

FIG. 3 shows a partial perspective view of the forward end of PCTCU 103, with the surrounding structures of TDRV 115 removed to expose the disk-shaped TCU 102. The following sections of the present teachings will focus on the preferred structures and functions of TCU 102 as a primary preferred embodiment of the present invention. FIG. 4 shows a side elevational view of TCU 102, mounted operably to forward end 122 of payload section 124 of PCTCU 103, according to the preferred embodiment of FIG. 2. FIG. 5 shows a sectional view, through the section 5-5 of FIG. 4, generally illustrating preferred component arrangements of PCTCU 103, according to the preferred embodiment of FIG. 2.

One preferred configuration of PCTCU 103 divides the structure into two main subcomponents, preferably comprising TCU 102 and payload section 124, as shown. Payload section 124 is further divided into a forward payload compartment 120 and aft section 128 by a transverse mid plate 130, as shown. Payload compartment 120 preferably functions to house the returning payload materials, with aft section 128 functioning to accommodate avionics, parachute package, and similar components. Payload section 124 preferably comprises a generally cylindrical shape preferably comprising an open forward end 132 (best viewed in FIG. 6B) to provide external access to the interior of payload compartment 120, as shown. Upon reading this specification, those with ordinary skill in the art will now appreciate that, under appropriate circumstances, considering such issues as design preference, user preferences, marketing preferences, cost, structural requirements, available materials, technological advances, etc., other shape arrangements such as, for example, spherical bodies, tapered bodies, asymmetrical lifting bodies, etc., may suffice.

One preferred configuration of PCTCU 103, TCU 102 comprises an assembled height A of about 1 inch and an approximately circular diameter B of about 3¼ inches. This physical configuration was identified as being useful for the intended small down-mass transport of scientific materials from orbit. It is noted that the preferred configuration of TCU 102 is scalable to produce alternate preferred embodiments of larger or smaller thermal capacity.

In addition to functioning as a self-contained cooling component, TCU 102 is preferably configured to function as a detachable lid 134 for payload compartment 120, as shown. This preferred arrangement functions both to reduce redundancy of system components and place heat-transfer structures of TCU 102 in direct thermal interaction with the internal environment of payload compartment 120 (at least embodying herein wherein such at least one intermediate structure defines at least one detachable lid structured and arranged to detachably lid the at least one forward open end of the at least one payload compartment).

Figure 6A:
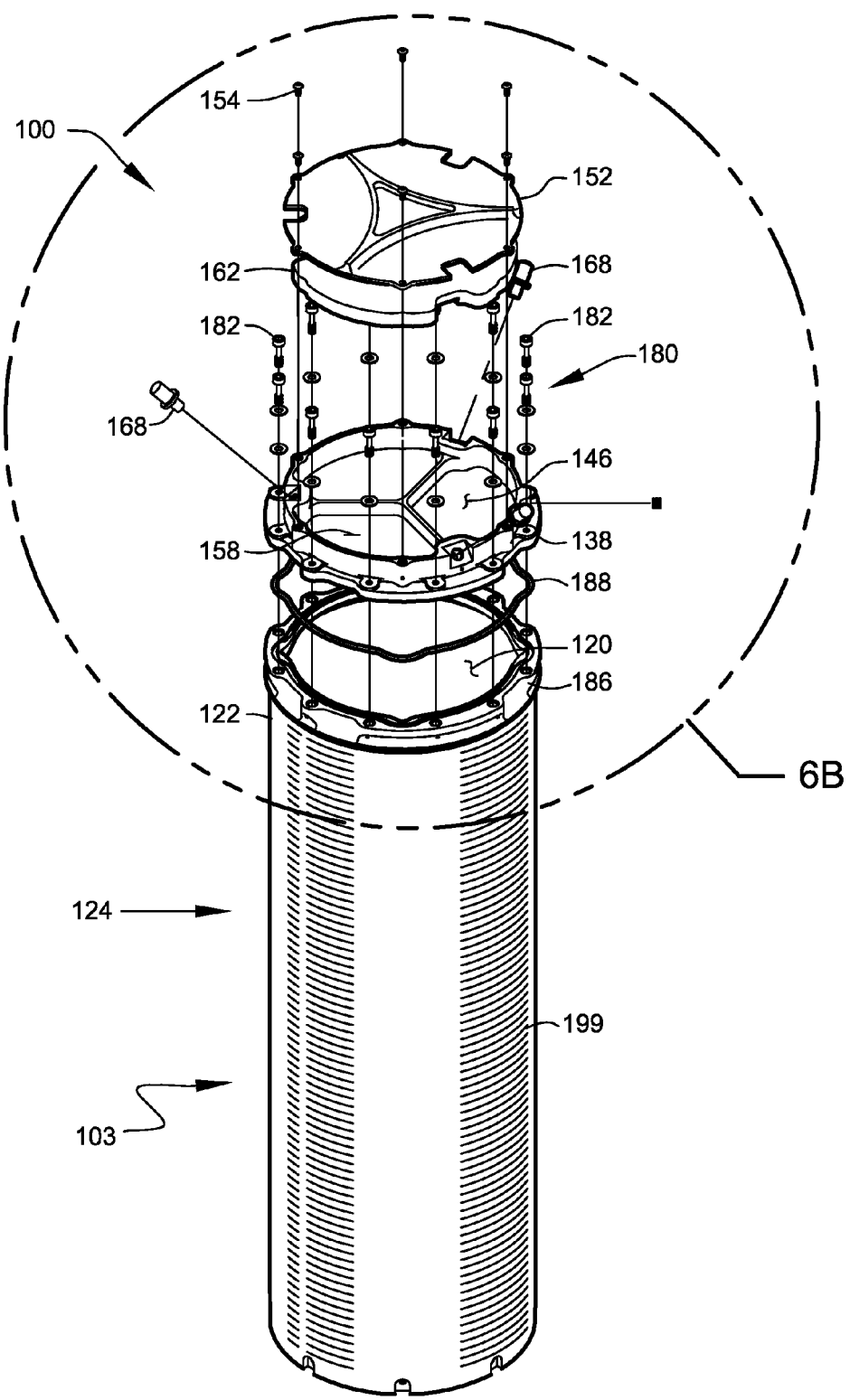
FIG. 6A shows an exploded view of the PCTCU, according to the preferred embodiment of FIG. 2.
Figure 6B:
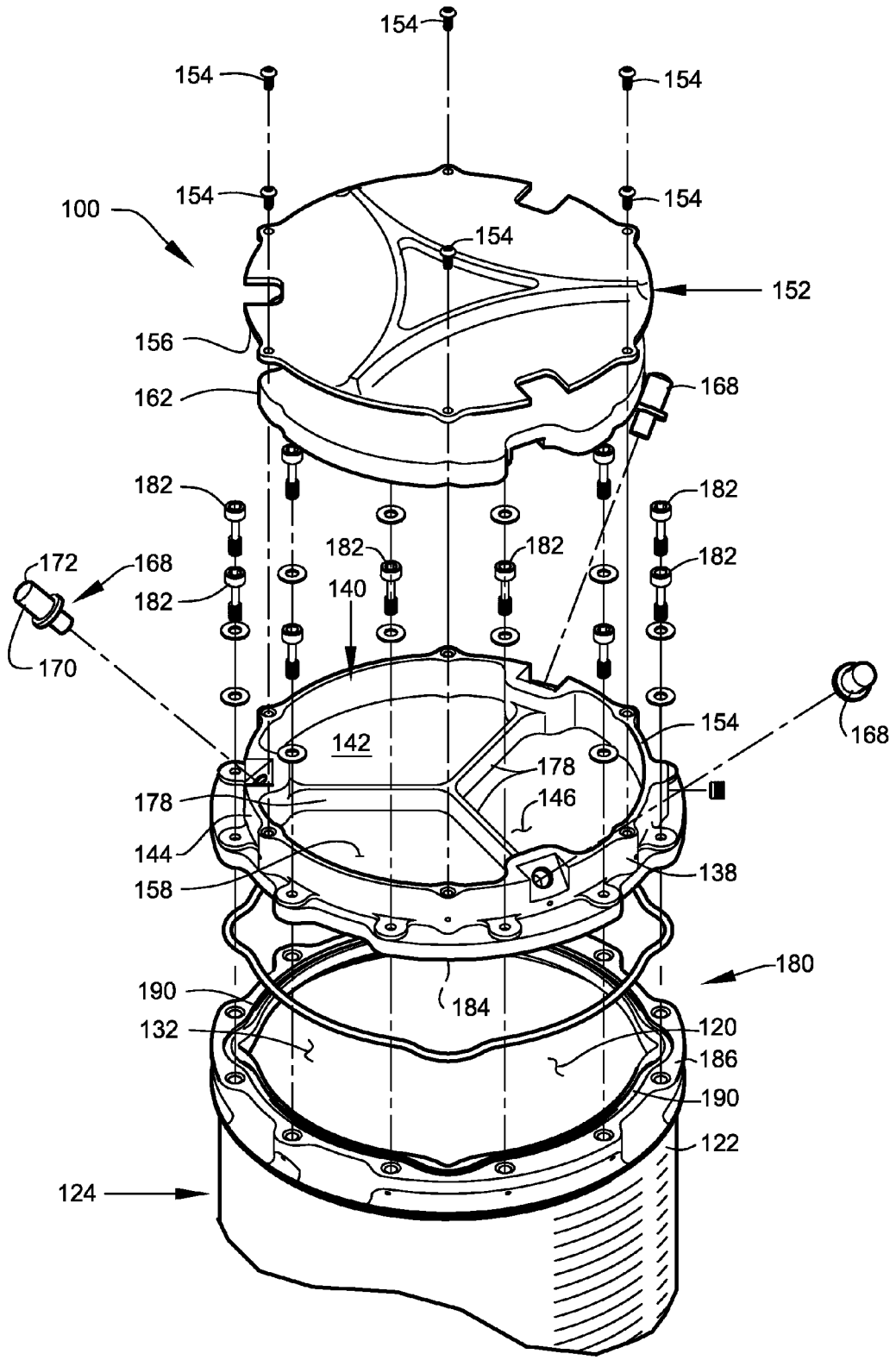
FIG. 6B shows a partial exploded view, of Detail 6B of FIG. 6A, illustrating the forward end of PCTCU, with the components of the TCU magnified for clarity of description, according to a preferred embodiment of the present invention.

FIG. 6A shows an exploded view of PCTCU 103, according to the preferred embodiment of FIG. 2. FIG. 6B shows a partial exploded view, of the Detail 6B of FIG. 6A, illustrating the forward end of PCTCU 103, with preferred components of TCU 102 magnified for clarity of description according to a preferred embodiment of the present invention.

TCU 102 preferably comprises a housing 138 having a forward open end 140, closed aft end 142, and a continuous peripheral sidewall 144 extending between the two structures, as shown. A removable cover plate 152 is preferably fitted to open end 140 to fully enclose a preferred cooling component 150 within a fully enclosed internal chamber 146, as shown. Forward open end 140 of housing 138 preferably comprises a peripheral engagement surface 155 structured and arranged to engage the undersurface 156 of cover plate 152, as shown. The interface of peripheral engagement surface 155 and undersurface 156 is preferably configured to form a continuous fluid-retaining seal 161, more preferably, a pressure-retaining seal configured to maintain internal chamber 146 (containing cooling component 150) within a selected pressure range, regardless of the pressure differential between internal chamber 146 and the ambient operational environment external of the chamber. Upon reading this specification, those with ordinary skill in the art will now appreciate that, under appropriate circumstances, considering such issues as intended use, component selection, design preference, etc., other seal arrangements such as, for example, allowing pressure venting between chamber and ambient, using seals designed to contain minimal pressure differentials (such as, earth-surface applications), etc., may suffice.

Both housing 138 and cover plate 152 are preferably constructed from a lightweight, rigid and appropriately durable material, more preferably a lightweight metallic material, more preferably a metallic material having a density of in the range of about 0.003 kilogram/cubic centimeter ($kg/cm^3$), a thermal conductivity in the range of about 1.2 Watts/centimeter-Kelvin (W/cm K), and a specific heat in the range of about 960 Joule/kilogram-Kelvin (J/kg K). One preferred material suitable for the construction of both housing 138 and cover plate 152 is '7075' aluminum alloy.

Removable cover plate 152 is preferably retained to open end 140 using a plurality of releasable mechanical retainers, more preferably a set of externally threaded fasteners 154, as shown. In the present preferred embodiment, six externally threaded fasteners 154 are evenly distributed about the periphery of removable cover plate 152, and preferably at least match ASTM-F835 standard specification for alloy steel socket button-head fasteners (at least embodying herein at least one second releasable mechanical retainer).

Cooling component 150 preferably comprises at least one Phase-Change Material (hereinafter referred to as PCM 160). Phase-change materials are those that can change from one physically distinct and mechanically separable state to another distinct form, such as a crystalline solid to a liquid state. Heat energy is absorbed during the phase transition, through a latent energy process. An ideal PCM 160 for the preferred embodiments of thermal-control system 100 is mass efficient, preferably comprising high heat capacity and high heat of fusion. In addition, it is preferred that the selected PCM 160 be chemically stable, preferably non-flammable, and preferably nontoxic. Based on this preference set, Applicant selected water as the preferred PCM 160 for use in the presently described preferred embodiments of thermal-control system 100. It is noted that such a preferred water-based PCM 160 preferably comprises water or, alternately preferably, a mixture of water and one or more added substances, such as, for example, nucleating agents, substances to lower the freezing point, etc. Upon reading this specification, those with ordinary skill in the art will now appreciate that, under appropriate circumstances, considering such issues as operating environment, intended use, etc., other water-based PCM compositions such as, for example, water amended with and an equal part of one or more substances, mixtures comprising water as a minority constituent of a PCM composition, etc., may suffice.

In addition to the latent heat storage capacity of PCM 160, it is also preferred that the ice be cooled to at least one temperature below the isothermic phase-change temperature of the selected material to obtain additional sensible heat storage capacity. In the preferred water-based PCM 160 such "super cooling" comprises cooling the material to at least one temperature below zero-degrees Celsius, preferably to temperatures ranging between about $-1°$ Celsius (C) and about $-150°$ C., more preferably ranging between about $-125°$ Celsius (C) and about $-150°$ C. This preferably allows TCU 102 to comprise additional sensible thermal storage capacity. Thus, TCU 102 (at least embodying herein such at least one intermediate structure) is preferably structured and arranged to assist absorbing the atmospheric entry heat, generated during return procedure 112, by implementing both sensible-heat processes and latent-heat processes (wherein such sensible-heat processes are effected by transition of PCM 160 from at least one sub-phase-change temperature to a higher temperature).

The use of a water-based PCM gives the highest heat capacity for the mass; however, the major disadvantage associated with the use of water as PCM 160 is the volume expansion of water as it freezes into ice. This occurs as the polar water molecules align to form crystalline lattices during transition from a liquid to solid state. The intended operational environment of TCU 102 requires PCM 160 to be fully contained within housing 138. Because of the relative large volume expansion and bulk modulus of elasticity of water to ice, it was determined that large mechanical forces would be imparted within the necessarily rigid structures of the enclosed housing 138 as the liquid water was frozen, potentially resulting in rupture of the container. Furthermore, the preferred thermal-conduction arrangements of TCU 102 require PCM 160 to be located and maintained in direct physical contact with at least one internal wall of internal chamber 146, including during operation of the device in the micro-gravity environment of space. It is noted that the preferred gravity-independent operational requirement of the device procluded partial filling of the chamber as a preferred option.

The preferred use of a water-based PCM 160 led Applicant to develop, within cooling component 150, both a volumetric accommodator function and a PCM locator function to preferably continuously locate PCM 160 within a selected region of internal chamber 146. As noted above, to be useable for space applications, both the volume expansion accommodation function and PCM locator function of cooling component 150 preferably must operate independent of gravity.

Figure 7:
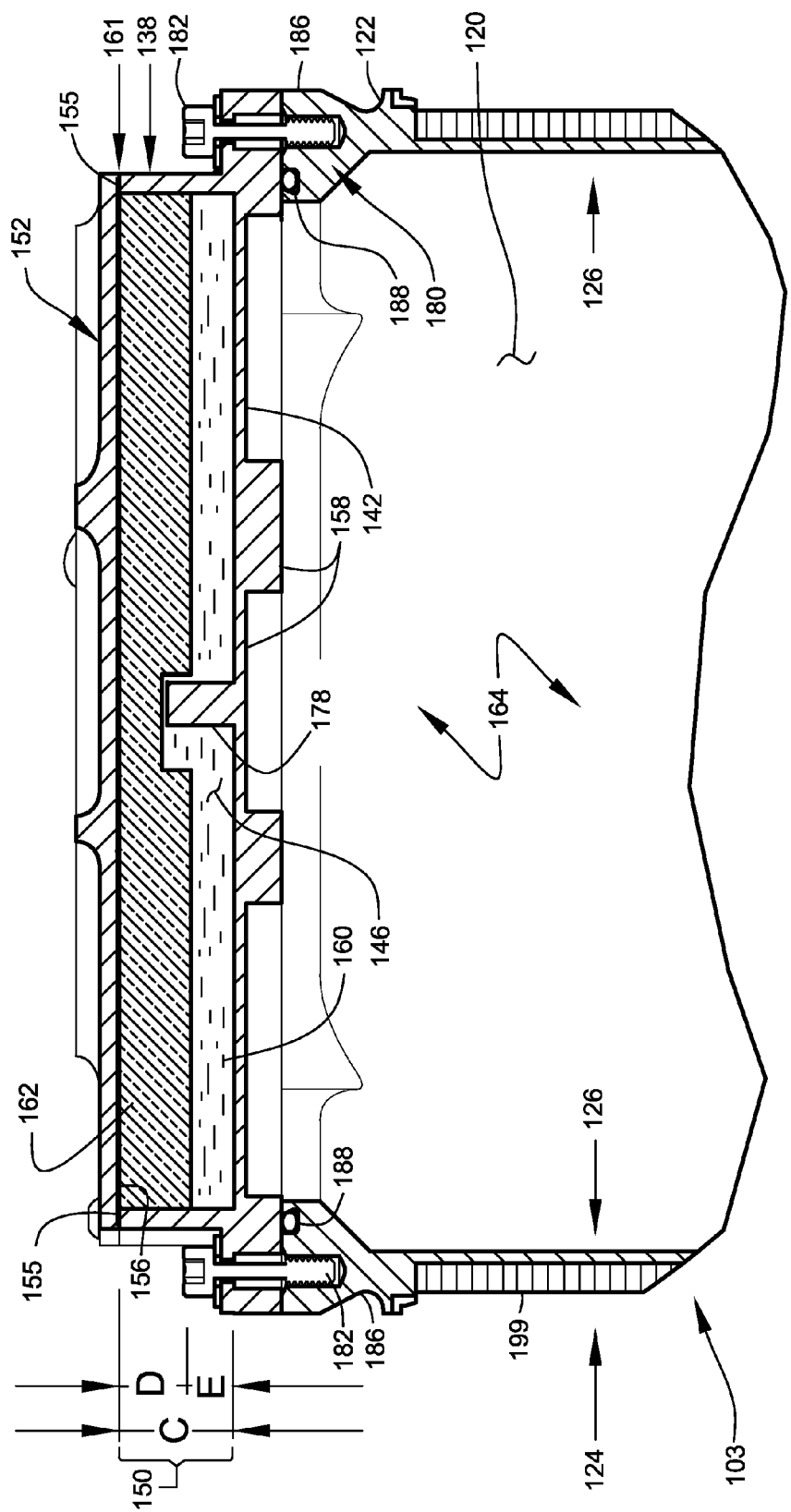
FIG. 7 shows a partial sectional view, of the sectional Detail 7 of FIG. 5, further illustrating the forward end of PCTCU, with the components of the TCU magnified for clarity of description, according to a preferred embodiment of the present invention.

Applicant's most preferred solution to the problem of PCM expansion, and the need to specifically locate PCM 160 within internal chamber 146, was the development and implementation of a compressible insert 162, preferably configured to reside within internal chamber 146 in contact with PCM 160, as best shown in FIG. 7.

FIG. 7 shows a partial sectional view, of the sectional detail 7 of FIG. 5, further illustrating the preferred arrangements of PCTCU 103, with the preferred components of TCU 102 magnified for clarity of description. Compressible insert 162 is preferably situated within the forward portion of internal chamber 146 so as to preferably bias PCM 160 toward closed aft end 142 of housing 138, as shown. Closed aft end 142 of housing 138 preferably functions as a heat-exchanging wall 158 structured and arranged to assist thermal exchange between PCM 160 and the internal thermal environment 164 of payload compartment 120, as shown (at least embodying herein wherein such at least one cooling component further comprises at least one locator structured and arranged to locate such at least one phase-change material in direct thermal interaction with such at least one heat-exchanging wall).

Compressible insert 162 preferably comprises at least one resiliently-deformable material, most preferably resilient compressible foam, more preferably a resilient compressible foam consisting of a foamed elastomeric material (elastomeric foam) having appropriate mechanical flexibility characteristics within the specified operational temperatures of the device. Upon reading this specification, those with ordinary skill in the art will now appreciate that, under appropriate circumstances, considering such issues as intended use, advances in material technology, etc., other a volumetric accommodators such as, for example, compressible gels, mechanical bellows, flexible container walls, etc., may suffice.

As the water-based PCM 160 freezes and expands, compressible insert 162 is compressed inside internal chamber 146 (generally toward cover plate 152). This responsively increases the working volume of internal chamber 146 during the phase change of PCM 160 from liquid to solid. Conversely, when PCM 160 melts and contracts, the foam preferably re-expands, pushing back on the liquid PCM 160, thereby maintaining PCM 160 in continuous thermal interaction with heat-exchanging wall 158.

Additionally, the foam material of compressible insert 162 provides a degree of thermal insulation, thus preferably functioning to reduce the rate of thermal migration of atmospheric-entry heat across TCU 102. The insulative properties of compressible insert 162 are also utilized during freezing of PCM 160. In a preferred on-orbit procedure, TCU 102 is preferably frozen prior to use by establishing an outward heat flow from PCM 160, preferably by exposing heat-exchanging wall 158 to at least one below 0° C. thermal sink. The tendency of the water to becoming "super cooled" (below 0° C.) yet remain in liquid state increases in microgravity. This can lead to a sudden and unpredictable freezing event. Such rapid freezing may overcome the ability of compressible insert 162 to buffer the volumetric capacity of internal chamber 146, resulting in a rupture of the container.

Freezing is preferably carried out such that the freezing occurs in a uniformly controlled manner, preferably by incrementally freezing PCM 160 substantially in only one direction, preferably from heat-exchanging wall 158 toward compressible insert 162. Compressible insert 162 preferably supports this preferred unidirectional freezing process by thermally insulating the end of internal chamber 146 opposite heat-exchanging wall 158.

Closed aft end 142 preferably comprises a symmetrical array of transfer fins 178, preferably projecting from heat-exchanging wall 158 into internal chamber 146 to be engaged within PCM 160. The array of transfer fins 178 are preferably structured and arranged to provide at least one supplementary pathway of heat transfer between PCM 160 and heat-exchanging wall 158. Upon reading this specification, those with ordinary skill in the art will now appreciate that, under appropriate circumstances, considering such issues as PCM volume, phase-change parameters, etc., other fin arrangements such as, for example, fins having non-parallel surfaces to assist in breaking up destructive crystalline structures which form during freezing, etc., may suffice.

In one preferred embodiment of the system, internal chamber 146 of TCU 102 preferably comprises an overall depth C of about 0.6 inch with compressible insert 162 comprising a thickness D of about 0.38 inches, the remaining depth E preferably occupied by PCM 160. In one preferred embodiment of the system, TCU 102 is structured and arranged to contain about 0.23 kilograms of PCM 160 (about ½ pounds). Upon reading this specification, those with ordinary skill in the art will now appreciate that, under appropriate circumstances, considering such issues as intended use, foam properties, etc., other arrangements such as, for example, using alternate fill ratios, larger or smaller contained volumes, multiple chambers, etc., may suffice.

TCU 102 further preferably comprises at least one forward coupler assembly 166 structured and arranged to assist the coupling of TCU 102 with nose cap 121 (or other forward atmospheric-entry structure of atmospheric-entry vehicle 110). Forward coupler assembly 166 preferably comprises a set of male mounting posts 168, preferably arranged to project outwardly from mounting points located on the forward outer periphery of housing 138, as shown. Male mounting posts 168 preferably comprise the aft portion of Applicant's preferred mounting system, which are preferably designed to engage a ring-shaped female mounting component 176 of the forward nose cap 121 (shown diagrammatically by the dashed-line depiction of FIG. 4). Forward coupler assembly 166 was preferably designed with thermal isolation as a primary goal. Beyond thermal isolation, forward coupler assembly 166 preferably provides a self-aligning structural connection adapted to support the anticipated structural loads generated during return procedure 112.

Figure 8A:
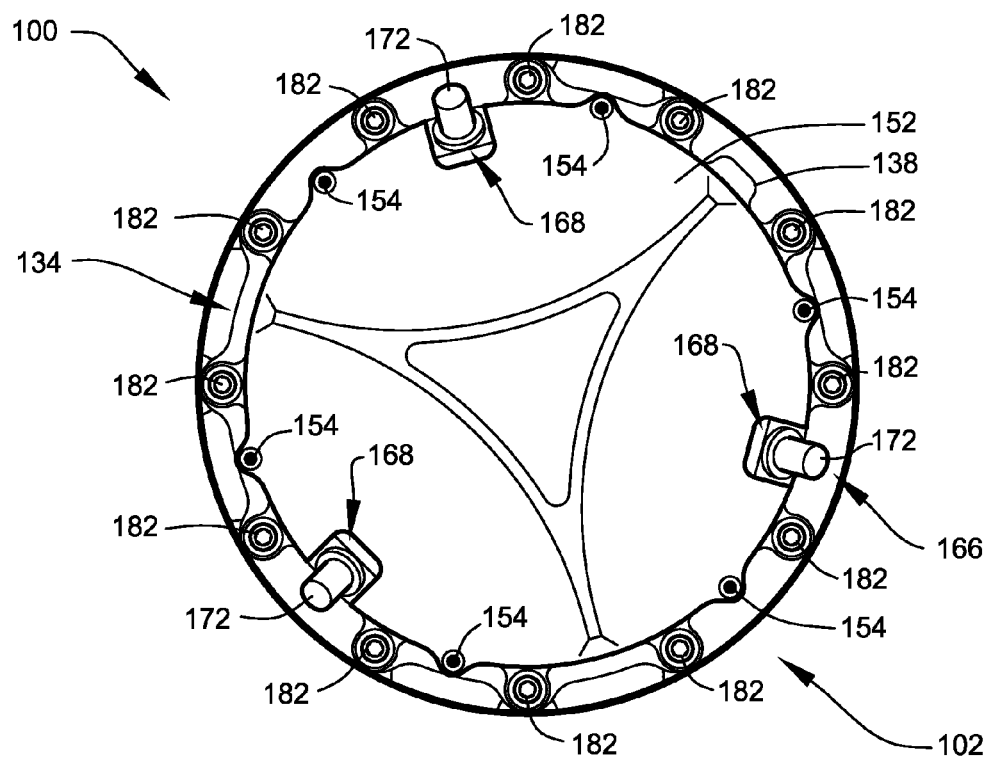
FIG. 8A shows a plan view of a forward wall of the TCU, according to the preferred embodiment of FIG. 2.

As illustrated in FIG. 8A, forward coupler assembly 166 preferably utilizes three male mounting posts 168 symmetrically distributed around the periphery of housing 138. Each male mounting post 168 preferably projects outwardly from housing 138 to terminate at distal end 170, which is preferably configured to comprise a hemispherical contact face 172, as shown. Each hemispherical contact face 172 preferably comprises an outer radius of about eight-centimeters.

When forward coupler assembly 166 is operably engaged, each hemispherical contact face 172 bears on a concave mating surface of female mounting component 176, most preferably at a single point of contact. The above preferred arrangement effectively reduces thermal conduction between the forward and aft vehicle structures by limiting the area of contact to three small points, as shown. Because the primary heating phase occurs in near vacuum (in space), thermal conduction is the major mechanism of heat transfer; thus, the above-described arrangement preferably functions as a thermal isolator 174 to thermally isolate non-coupled portions of TCU 102 from the atmospheric-entry heat generated by the forward atmospheric-entry structure during atmospheric entry.

It should be noted that a structural design feature of forward coupler assembly 166 is that the connection between male mounting posts 168 and the female mounting component is not perfectly rigid; thus, thermal contact areas arise that are hardness dependent. Therefore, mount materials are preferably made of, or coated with, very hard metals to assist in controlling the overall thermal and structural performance of the mount. The materials used in the principal components of forward coupler assembly 166 have a preferred Rockwell hardness of between about 60 and about 70. The structure(s) between the male and female mounts preferably are designed to withstand system loads causing the entire structure to operate as a pseudo rigid-body. In a preferred embodiment of the present system, male mounting posts 168 comprise a metallic material having a density of in the range of about 0.004 kg/cm$^3$, a thermal conductivity in the range of about 0.07 W/cm K, and a specific heat in the range of about 522 J/kg K. A preferred material suitable for the construction of male mounting posts 168 preferably comprises titanium alloy.

During experimental development, Applicant determined an acceptable contact area between male mounting posts 168 and the female mounting component to be about 0.0012 square inches each. A computer-assisted thermal model was constructed by the Applicant to determine the effective thermal resistance for each male mounting post 168. The results of the thermal model analysis indicated an effective thermal resistance for the assembly of about 108 C/W when using titanium and the physical geometric arrangements described above.

TCU 102 preferably comprises at least one aft coupler assembly 180 to couple detachably TCU 102 to open forward end 132 of payload section 124 and payload compartment 120, as shown. A preferred function of aft coupler assembly 180 is to position heat-exchanging wall 158 in thermal interaction with the internal thermal environment 164 of payload compartment 120 (at least embodying herein wherein such at least one aft coupler comprises at least one postioner structured and arranged to assist positioning of such at least one heat-exchanging wall in thermal interaction with at least one thermal environment of the at least one payload compartment). In addition, aft coupler assembly 180 is preferably adapted to support the operation of TCU 102 as a detachable lid 134 for payload compartment 120.

Aft coupler assembly 180 preferably comprises a plurality of releasable mechanical retainers, more preferably a set of externally threaded fasteners 182, as shown (at least embodying herein wherein such at least one aft coupler comprises at least one first threaded retainer structured and arranged to assist threaded retention of such at least one payload-compartment lid to the at least one open forward end of the at least one payload compartment). Other fastener-related hardware, such as washers, thread-lock materials, etc. are preferably included within the assembly, as shown. Those with ordinary skill in the art will now appreciate that upon reading this specification and by their understanding the art of fastener attachment as described herein, methods of attaching such washers, lock-nuts, etc will be understood by those knowledgeable in such art.

Housing 138 preferably comprises aft mating surface 184 (see FIG. 8B) structured and arranged to assist forming at least one mated engagement with a circumferential mounting ring 186 of forward end 122. In the present preferred embodiment, 12 externally threaded fasteners 182 are evenly distributed about the periphery of housing 138, and are preferably captured rotatably within a set of peripheral apertures, passing through aft mating surface 184 to threadably engage mounting ring 186, as shown (at least embodying herein at least one first releasable mechanical retainer structured and arranged to assist releasable mechanical retention of such at least one intermediate structure to the at least one open forward end of the at least one payload compartment). Upon reading this specification, those with ordinary skill in the art will now appreciate that, under appropriate circumstances, considering such issues as cost, intended use, etc., other fastening arrangements such as, for example, releasable clamps, threaded engagements, permanently sealed containers, etc., may suffice.

Mounting ring 186 of payload section 124 preferably comprises at least one pressure-retaining seal, preferably O-ring seal 188 located in circumferential channel 190, as shown. When aft mating surface 184 is secured to mounting ring 186, O-ring seal 188 preferably assists in maintaining a generally isobaric pressure level within the internal thermal environment 164 of payload compartment 120. This preferably forms payload compartment 120 into a sealed pressure vessel 126.

During experimental development, Applicant generated three-dimensional thermal computer models to examine heat transfer phenomena of the proposed TDRV 115 design with regard to the preferred PCTCU 103 and TCU 102 component during entry stage 118. The model of TDRV 115 provided preliminary data associated with temperature extremes that vehicle components are expected to encounter for this operational stage. A general description of the experiment is provided herein to further the understanding and enablement of TCU 102, in the context of a preferred implementation of the invention.

A transient thermal model was created by the Applicant using THERMAL DESKTOP® (ver. 5.2). It comprised a three-dimensional model of the mid portion of TDRV 115, assuming PCTCU 103 to be empty. Structurally, it consisted of the exterior shell of TDRV 115, payload section 124, its exterior casing (omitted from the illustrations for clarity), TCU 102, forward coupler assembly 166 (male and female components), and the PCM 160 incorporated within TCU 102. PCTCU 103 was modeled with TET (Tetrahedral)) elements for the mounting ring 186 and the mid-plate 130 (which separates payload compartment 120 from aft section 128) and with 2-D shell elements for the forward and aft cylinders of payload compartment 120 and aft section 128. The sections were connected via contactors that simulated continuity of the part.

TCU 102 was likewise modeled with TET elements, and the outer casing and adjacent structures of TDRV 115 were modeled as shell elements. As previously noted, male mounting components of forward coupler assembly 166 were preferably represented as thermal conductors. The model neglected the thermal mass of the mounts, but the effect on the transient response was expected to be slight with regard to the significant thermal mass of the adjacent TCU 102.

PCM 160 was preferably represented by a boundary node with a fixed temperature for the purpose of analysis. The temperature was held at the phase-change temperature (0° C., for assumed water-based PCM 160). The total heat transferred to this node was compared to the latent capacity of water for the available volume to validate the assumption.

The thermal model was simplified to omit nose cap 121, with its associated avionics and components, the aft avionics and parachute package, the aft mounts, and the aft body with attached flare 116. As the goal of Applicant's analysis was to evaluate potential thermal risk to payload 104, these components were not considered critical to the scope of the analysis. The aft avionics heat dissipation load was however accounted for. The full avionics dissipation (about 5.345 W) was assumed to sink into the aft cylinder in a circumferential band, encompassing a ring of calculated thermal nodes, aft of mid plate 130 (about 2 cm to 4 cm back from the plate).

The missing components are considered thermally remote from payload compartment 120 and payload 104. For example, nose cap 121 is preferably separated from the forward avionics by standoffs and preferably from PCM 160 by male mounting post 168 of TCU 102. Additionally, the preferred interstitial insulation 199 was not modeled within the casing enclosing PCTCU 103. Using a multi-layer insulation 199 in the casing design would further decrease the effective emissivity of the enclosure, thereby producing an even more robust solution in the eventual vehicle design. The outer shell of the proposed TDRV 115 is likely to comprise carbon-carbon composite thermophysical properties (parallel to fiber direction), and the inner cylindrical walls of payload section 124 (comprising pressure vessel 126) is preferably constructed of aluminum '2024'.

Pressure vessel 126 and TCU 102, and the casing edge and PCTCU 103 are assumed to have no effective thermal resistance in their respective mated surfaces. For the purpose of the analysis, PCM 160 was assumed to be in intimate contact with the three plate surfaces of the exterior of TCU 102, and not with the flanges/webs, through the use of a large valued conductor. The gap between the vessel and casing was assumed to be voided and to provide an effective, combined emissivity of about 0.01 for the enclosure (facing anodized surfaces of about 0.1 emissivity). A vacuum gap was also assumed to be present between mounting ring 186, TCU 102, and casing and the shell of TDRV 115, providing an enclosure emissivity of about 0.088. The exterior of TDRV 115 was assumed to have an emissivity of about 0.88.

All structures were assumed to have an initial temperature of 0° C., modeling a frozen water-based PCM 160 without "supercooling". Two analyses were made: one with PCM 160 active and another without the benefit of PCM 160. The "with PCM" configuration is considered the baseline for the present system.

The exterior of TDRV 115 was assumed to radiate to a constant sink temperature of about 25.5° C. (representative of a median Earth temperature, and assumes no space view or flare component). The re-entry environment is simulated via the application of a heat flux load on the exterior of TDRV 115 representing a typical entry profile.

The thermal model determined that while the double vacuum gaps provide a significant radial temperature gradient, the exterior (female) mount temperature closely tracks the external temperature; however, interior component temperature profiles, including the interior (male) mount point temperature, was observed to be substantially lower. The change of temperature was found to be relatively small (<7° C.), both from radiation to the cylinder walls and from conduction through the mounts.

The analysis clearly showed that PCM 160 is critical for this result, as heat from the mounts is conducted into PCM 160, rather than contributing to a temperature rise within TCU 102. This is demonstrated by comparing the modeled temperatures for PCTCU 103 "with" and "without" PCM 160. Heat load compensation by PCM 160 was profiled in the analysis and was found to comprise a total energy equivalent of about 16.9 kJ. As the heat of fusion for ice is 333 kJ/kg, approximately 0.05 kg (0.112 lbs) of the water-based PCM 160 was expended during the simulated entry stage 118. This is weighed against the approximate 0.46 pounds of ice that above-described embodiment of TCU 102 preferably holds.

The other component temperatures were found to be effectively independent of PCM 160, as the vessel walls of PCTCU 103 proved thin enough not to conduct significant heat as to affect the temperatures in the bulkier sections, and vice versa.

Applicant's analysis suggests that keeping PCTCU 103, and thereby payload 104, from any significant temperature rise during entry stage 118 is fully feasible using the preferred embodiments of the system. Temperatures of pressure vessel 126 were predicted to increase approximately 2° C., and payload 104 will be further isolated by internal insulation. The preferred design of TCU 102 as integrated within PCTCU 103 effectively retarded heat flow from the external shell of TDRV 115 by conduction through the mounts and by radiation across the voids to the main body of PCTCU 103. The necessity of the preferred TCU 102 design containing PCM 160 to absorb heat conducted through the mounts was demonstrated by the thermal analysis. Furthermore, as entry stage 118 was considered the primary heating contributor, and PCM 160 was exhausted by less than a fourth of its capacity, the effectiveness and utility of the preferred design was confirmed.

Figure 8B:
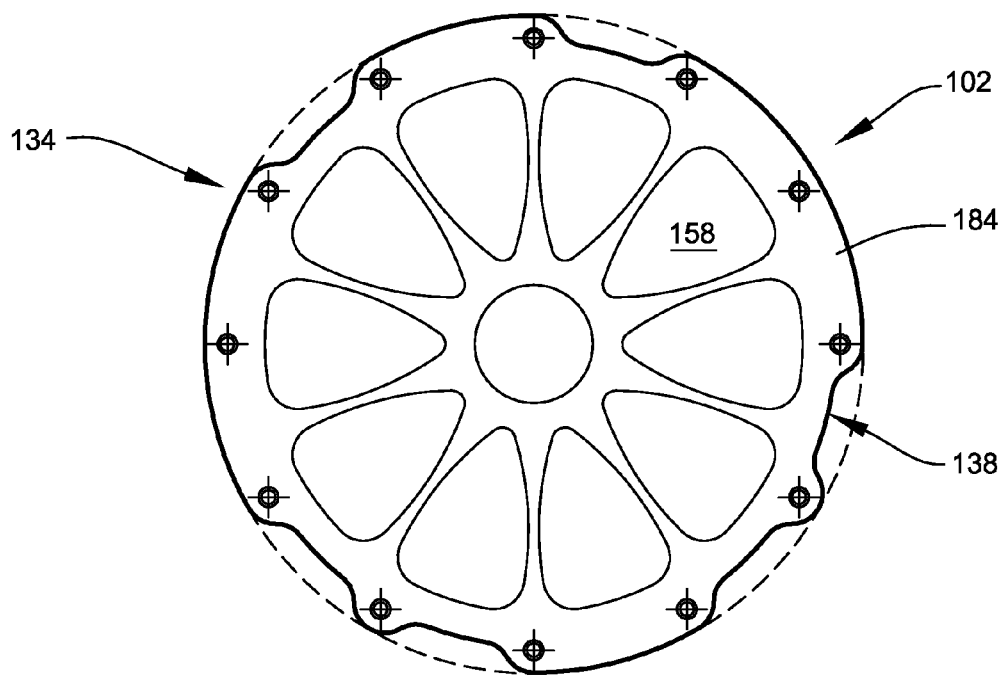
FIG. 8B shows a plan view of an aft wall of the TCU, according to the preferred embodiment of FIG. 2.

FIG. 8A shows a plan view of the forward structures of TCU 102, according to the preferred embodiment of FIG. 2. FIG. 8B shows a plan view of a preferred arrangement of aft mating surface 184 of TCU 102, according to the preferred embodiment of FIG. 2.

FIG. 9 shows an extra-vehicular activity suit (EVA suit 200) comprising a portable life support system (PLSS 203) utilizing at least one Thermal Control Unit (TCU 202), according to an alternate embodiment of the present invention. On Jul. 20, 1989, the 20th anniversary of the Apollo 11 Moon landing, George H. W. Bush, then President of the United States, announced plans for what came to be known as the Space Exploration Initiative. With the advent of the Exploration Initiative, and its stated goal to perform long-term research on the moon, the logistics imposed by an expendable thermal control system are daunting. For example, assuming 24-hours of Extra-Vehicular Activities (EVAs) per week, and assuming a 400 W average heat load (300 W metabolic+100 W equipment), for a six-month period, a total of 359 kg of water would need to be expended per astronaut, which equates roughly to a total of about 718 kg (0.79 ton) for two crew members.

An additional goal is to be able to perform EVAs anywhere on the lunar surface, which presents challenges for the potential use of conventional radiator technologies, due to the hot thermal environment at and around the sub-solar point. In contrast, a PCM-based EVA cooling system has the advantages of no consumables and operation independent of the local radiation thermal environment. A phase change material such as PCM 160 can absorb the heat for later rejection between EVA operations.

FIG. 10 shows a rear view, diagrammatically illustrating the integration of TCU 202) within a wearable "pack" containing PLSS 203 of EVA suit 200, according to a preferred embodiment of the present invention. FIG. 11 shows a sectional view, through the section 11-11 of FIG. 10, generally illustrating preferred component arrangements of TCU 202, according to the preferred embodiment of FIG. 10.

TCU 202 preferably comprises PCM 160 configured as a heat sink, preferably utilizing "super cooled" ice as a non-toxic, non-flammable PCM within PLSS 203. As previously discussed, the latent heat of fusion for water is relatively large. Further mass reduction is preferably accomplished by cooling the ice significantly below its freezing temperature for additional sensible heat storage. Expansion and contraction of the water as it freezes and melts is accommodated with the use of a flexible internal membrane 204 and compressible foam liner 206, as shown.

The concept of the use of TCU 202 is that the unit is preferably cooled within some support station of the vehicle from which the EVA will be initiated. TCU 202 is preferably installed within the system once the EVA suit coolant system is running and an appreciable heat load is being generated. An astronaut would then rely on TCU 202 as a heat sink for the duration of the EVA or swap a completely melted pack with a fresh, super cooled replacement pack, depending on the thermal storage capacity of the pack and the EVA duration. After TCU 202 is removed from the suit support system (usually PLSS 203) it is preferably frozen by cooling PCM 160 to below 0° C. for the next use. All of these operational steps would impose requirements on TCU 202, such as the accommodation for installation, the sloshing and other movement inherent in a backpack-mounted system, and predictable thawing/heat absorption during the duration of the ice temperature rise, conversion of the fluid to liquid form, and final heating to the maximum usable temperature.

As with the prior embodiment system, the preferred PCM is water. Water's inherent high heat capacity and high heat of fusion combined with its non-flammable, nontoxic characteristics makes it an ideal candidate for PCM 160; however, the major drawback is again the expansion of water into ice when it freezes. This expansion presents problems of containment, and possible rupture of the containment vessel. Through experimentation, Applicant has solved this problem by the use of a flexible membrane material coupled with a flexible foam material to accommodate the expansion and contraction of the water as it freezes and melts.

To take advantage of the large heat capacity of ice, and to further reduce the mass of water required, it is desirable to "super cool" the PCM below the freezing temperature by exposing PCM 160 to very low temperatures (preferably between about −125 K and −150 K). Through empirical testing, Applicant demonstrated the functional utility of the preferred TCU 202 that allowed for water expansion and contraction during repeated freeze/thaw cycles occurring between about 20° C. and about −150° C.

One of the challenges for using a PCM in a PLSS is to balance the trade between thermal capacity (duration) and on-back weight. A PCM-based unit with enough thermal capacity for a full eight-hour EVA has an advantage of requiring no mid-EVA change-out and its associated overhead. However, such a PCM-based unit may result in a PCM mass that is too large from the perspective of center of gravity and/or on-back weight. Assuming an average heat load of 400 W (300 W metabolic+100 W equipment), and depending on the additional sensible energy available by super cooling the PCM to below 0° C., an eight-hour EVA would require about 20 kg-25 kg of water-ice. This calculation does not include the additional mass of the packaging of TCU 202, which adds as much as one to two times as much mass as PCM itself. Based on this analysis, Applicant focused on achieving a four-hour EVA duration thermal capacity for TCU 202.

Referring again to FIG. 9, two potential locations of TCU 202 are available, both preferably located within region 208 of EVA suit 200, as shown. These preferred locations preferably comprise the bottom of the PLSS 203, as shown in FIG. 10, or alternately, on the front of the suit across the waist-belt region 210. Using a maximum length of 23 inches, based on the approximate width of the current PLSS designs, a preferred capacity of about 16 kilograms (kg) of water-based PCM 160 is possible, accounting for accommodation requirements associated with other subsystems of PLSS 203. In one preferred embodiment of TCU 202, this volume of PCM 160 is preferably packaged within container 212 having the approximate physical dimensions of about 23 inches×about 6.5 inches×about 6.5 inches (thus enabling a preferred internal capacity of about 972 cubic inches).

This preferred "pack" supported embodiment of TCU 202 preferably comprises at least one fluid-retaining boundary 201, in part formed by the flexible internal membrane 204, more preferably comprising a flexible bag 214, preferably located internally within container 212, as shown (at least embodying herein at least one fluid-retaining boundary structured and arranged to retain the at least one phase-change material in the at least one liquid state and the at least one solid state). Flexible bag 214 is preferably structured and arranged to retain PCM 160 within container 212 while in both the liquid state and the solid frozen state. Container 212 preferably functions as a protective outer shell to protectively enclose portions of such fluid-retaining boundary including flexible bag 214, as shown. The outer shell of container 212 preferably comprises a rigid composite material having a fixed external volume.

TCU 202 further comprises at least one heat-transfer interface 216 structured and arranged to establish at least one physical interface enabling heat transfer across the fluid-retaining boundary within container 212. In one preferred arrangement of TCU 202, heat-transfer interface 216 comprises a thermally-conductive cover plate 218, which may preferably comprise one or more heat-transfer structures, such as, for example, passages for the circulation of secondary coolants, thermocouples, sensors, etc. Depending on selected weight restrictions within PLSS 203/EVA suit 200, copper may be selected as a preferred material for use in the construction of cover plate 218, due to its high thermal conductivity.

The thermally-conductive cover plate 218 preferably comprises at least one heat-transfer assister 220 in the preferred form of a plurality of projecting fins 222, as shown. Fins 222 are preferably structured and arranged to be embedded within multiple locations within PCM 160, as shown, to assist heat transfer between PCM 160 and the supplied heat-transfer interfaces of cover 218 (at least embodying herein at least one heat-transfer assister structured and arranged to assist heat transfer between the at least one phase-change material and such at least one heat-transfer interface). Each projecting fin 222 preferably comprises a plurality of heat-exchanging surfaces 221, each one structured and arranged to assist exchanges of heat energy between PCM 160 and its respective projecting fin 222, as shown.

Figure 12:
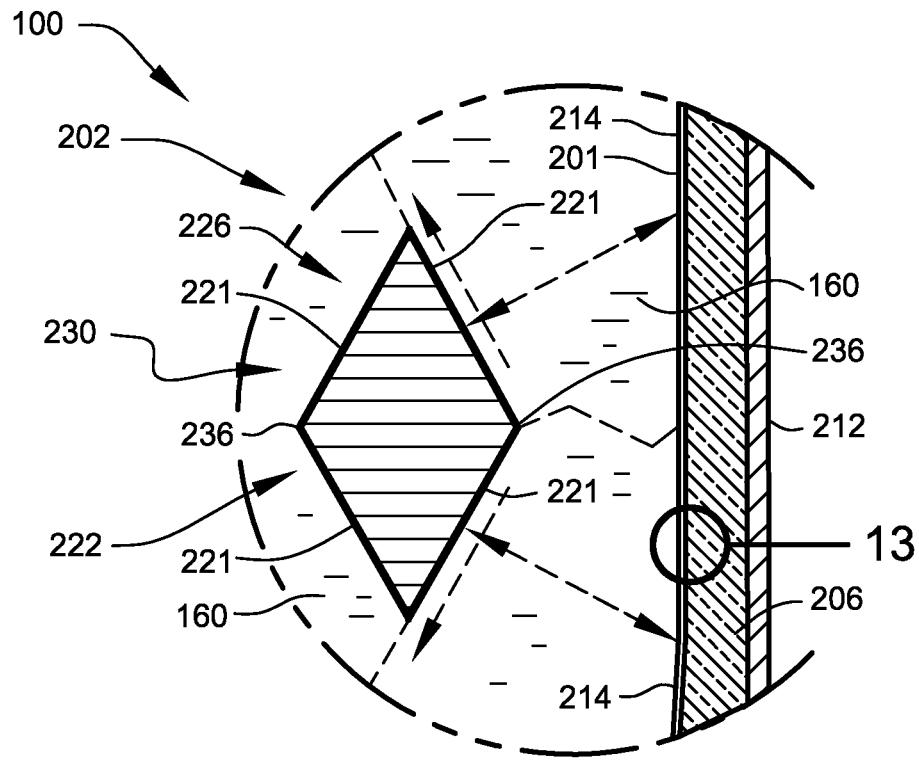
FIG. 12 shows a sectional view, through the section 12-12 of FIG. 11, generally illustrating preferred component arrangements of the TCU, according to the preferred embodiment of FIG. 10.

Each projecting fin 222 preferably comprises proximal end 232, preferably joined with cover plate 218, and at least one distal end 234, as shown. Projecting fin 222 preferably comprises a longitudinal length 'L' separating proximal end 232 and distal end 234, as shown. Projecting fin 222 preferably comprises at least one parallelogram-shaped lateral cross-section 226 within longitudinal length 'L', as best shown in FIG. 12. In addition, each projecting fin 222 preferably tapers from proximal end 232 to distal end 234, as shown in FIG. 11.

FIG. 12 shows a sectional view, through the section 12-12 of FIG. 11, generally illustrating preferred component arrangements of TCU 202, according to the preferred embodiment of FIG. 10. Flexible bag 214 preferably comprises a plurality of interior surfaces in direct physical contact with PCM 160, as shown. The function of the diaphragm-like flexible bag 214 is to allow for the expansion and contraction of the water as it freezes and thaws. A compressible foam layer 223 is preferably supplied between flexible bag 214 and inner wall surfaces of container 212, as shown. Compressible foam layer 223 inside container 212 compresses as the water-based PCM 160 freezes and expands.

Material selections for flexible bag 214 was challenging due to the extremely low temperature (approximately −150° C.) to which the material must be useable (resulting in a derived requirement of an extremely low glass transition temperature). Additionally, the material of flexible bag 214 must not be permeable to gas.

Applicant's original concept was to use an elastic material that would accommodate the volume changes by stretching elastically. Such materials investigated included Viton© fluoroelastomer and low-permeability silicone; however, with subsequent testing, and the preferred incorporation of a compressible foam liner 206 into the preferred design, the material focus switched to diaphragm materials that are flexible, but not necessarily elastic. These preferred materials were demonstrated to accommodate the volume changes of the water, but instead of stretching, they simply fold (crinkle) and unfold, as suggested in the illustration of FIG. 13. Through analysis and testing, Applicant selected a commercially available polyvinyl fluoride (PVF) sheet as the most preferred material for flexible bag 214. The selected material is flexible down to about −100° F. (−73° C.), and usable from about −385° F. (−231° C.) to about 225° F. (107° C.) with intermittent spikes to about 400° F. (204° C.). Although the flexible temperature limit (−73° C.) is not as low as the expected useable lower temperature limit (−150° C.), most of the volume change occurs with the phase change between solid and liquid at 0° C.

Foam liner 206 preferably provides a resiliently-deformable member providing at least one region of resiliently-deformable volumetric expansion between such at least one expandable fold and such at least one outer shell. The minimum volume increase provided by compression of foam liner 206 is preferably equal to the maximum calculated volume increase of PCM 160 after freezing. Although volumetric accommodation is the primary function of the foam, the foam envelope provides some degree of insulation for PCM 160.

Figure 13:
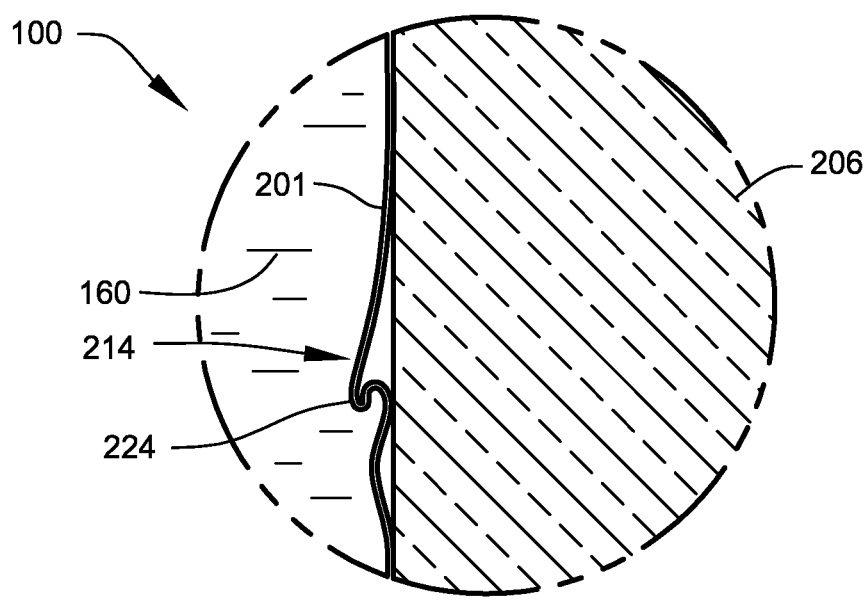
FIG. 13 shows a partial sectional view, of the sectional detail 13 of FIG. 12, magnified for clarity of description according to a preferred embodiment of the present invention.

FIG. 13 shows a partial sectional view, of the sectional detail 13 of FIG. 12, magnified for clarity of description. Flexible bag 214 is preferably sized and configured so as to preferably form a plurality of expandable folds 224 within the flexible walls of the bag, particularly when PCM 160 is in a liquid state. These expandable folds 224 (crinkles) are preferably structured and arranged to assist articulated expansion of portions of flexible bag 214 to accommodate volumetric changes of PCM 160 during phase transition from liquid to solid and back. The preferred use of folds within the fluid membrane effectively resolves the issue of poor mechanical flexibility within the bag materials when PCM 160 is cooled to a temperature below 0° C. for additional sensible heat capacity.

Referring again to FIG. 12, an important feature of presently disclosed embodiment of thermal-control system 100 is controlling the movement of ice during the freezing process to reduce stresses associated with phase-change expansion. This is necessary to allow the use of water as a mass-efficient PCM 160 within the relatively larger PCM capacity of TCU 202.

In a highly preferred arrangement of the system, projecting fins 222 are preferably configured to comprise what may be characterized as a "mechanical disrupter" 230 structured and arranged to assist mechanical disruption of frozen crystalline lattices occurring within PCM 160 during the phase-change transition from the liquid state to the solid state. Such a mechanical disrupter 230 is preferably generated within PCM 160 by arranging the heat-exchanging surfaces 221 of each projecting fin 222 in a specific non-parallel arrangement, as shown. This highly preferred configuration organizes each projecting fin 222 to comprise parallelogram-shaped lateral cross-section 226, as shown. Such a preferred "diamond" fin shape provides groupings of sloping surfaces that function to "push" ice away from adjacent surfaces during freezing.

In more specific terms, each heat-exchanging surface 221 comprises at least one non-parallel orientation relative to all opposing adjacent interior surfaces of the plurality of interior surfaces of flexible bag 214 and all opposing adjacent heat-exchanging surfaces 221 of the fins, as shown. Such non-parallel orientation of respective opposing surfaces produces mechanically-disruptive movement of the crystalline lattices occurring within PCM 160 during phase-change transition from the liquid state to the solid state.

As PCM 160 freezes outwardly from heat-exchanging surface 221, the rigid ice structure eventually intersects an adjacent opposing surface. Because the opposing adjacent surfaces are non-parallel, the lines of action developed by the expanding ice between the surfaces include non-normal force vectors, which produce pressure-reliving movements of the ice as it is "squeezed" outwardly from between the rigid structures, as shown. In addition, this preferred arrangement provides sharp angular edges 236 that preferably function to break up (cleave) the crystalline lattices of the ice during freezing. This preferred geometric configuration eliminates the potential for destructive entrapment of ice by eliminating adjacent parallel planar surfaces (at least embodying herein wherein each heat-exchanging surface comprises at least one non-parallel orientation relative to all opposing adjacent interior surfaces of such plurality of interior surfaces and all opposing adjacent heat-exchanging surfaces of such plurality of heat-exchanging surfaces; and such non-parallel orientation of such respective opposing surfaces produces mechanically-disruptive movement of the crystalline lattices occurring within the at least one phase-change material during such at least one phase-change transition from the at least one liquid state to the at least one solid state).

Upon reading this specification, those with ordinary skill in the art will now appreciate that, under appropriate circumstances, considering such issues as intended use, terrestrial needs, etc., other PCM arrangements such as, for example, instantaneous cooling in automobiles, may suffice. In such an arrangement, a PCM unit could be adapted to allow for instantaneous cooling in automobiles. In hybrid and electrical vehicles, substantial amounts of the electrical storage of the battery are used for initial cooling of the automobile interior. Furthermore, the use of PCMs would extend the range of the vehicle or reduce the size of the batteries. These advantages would provide a market-derived benefit for the companies that employ these techniques. Secondary useful applications may also include thermally-controlled suits for firefighters and similar extreme-environment cooling applications.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A thermal control system, comprising:
a container, the container having an opening and one or more interior surfaces;
a boundary, the boundary lining the interior surfaces of the container, the boundary configured to retain a phase-change material, wherein the boundary comprises a flexible material, the phase-change material having a first state and a second state;
a compressible foam between the container and the boundary; and
a heat transfer interface, the heat transfer interface positioned at the opening of the container, wherein the heat-transfer interface comprises: a plurality of protruding fins, the plurality of protruding fins extending into the phase-change material, wherein each protruding fin has a distal end, a proximal end connected to the heat transfer interface, and a longitudinal section between the proximal end and the distal end, wherein each protruding fin comprises a plurality of heat-exchanging surfaces extending from the proximal end to the distal end, each heat-exchanging surface intersecting an adjacent heat-exchanging surface to form an angled edge in contact with the phase-change material from the proximal end to the distal end, each heat-exchanging surface of the plurality of heat-exchanging surfaces being non-parallel to each of the plurality of interior surfaces of the container.

2. The system according to claim 1 wherein the angled edge is configured to mechanically disrupt the phase-change material when the volume of the phase-change material increases during a transition from the second state to the first state.

3. The system according to claim 1
wherein the protruding fin comprises a parallelogram-shaped lateral cross-section within the longitudinal section.

4. The system according to claim 3 wherein each protruding fin tapers from the proximal end to the distal end.

5. The system according to claim 4 wherein the plurality of heat-exchanging surfaces for each protruding fin are sloped to form a pyramid shape from the proximal to the distal end.

6. The system according to claim 1 wherein the boundary comprises a bag made of the flexible material, wherein the bag is configured to crinkle when a volume of the phase-change material decreases during a transition from the first state to the second state, and wherein the bag is configured to unfold when the volume of the phase-change material increases during a transition from the second state to the first state.

7. The system according to claim 6 wherein the container comprises a rigid material and is disposed around the boundary, and wherein the heat transfer interface is configured to enclose the phase-change material within the container so that there is substantially no empty space within the container.

8. The system according to claim 5 wherein the flexible material comprises polyvinyl fluoride.

9. The system according to claim 1 wherein the phase-change material is water based.

10. The system according to claim 9 wherein the phase-change material comprises at least one cooled temperature below an isothermic phase change temperature of the phase-change material.

11. The system according to claim 1, further comprising:
a payload compartment comprising a forward section and an aft section, wherein the container is coupled detachably to the forward section of the payload compartment and serves as a detachable lid for the payload compartment.

12. The system of claim 11, wherein the heat-transfer interface is positioned to be in thermal interaction with a thermal environment of the payload compartment.

13. The system of claim 1, wherein the flexible material has a useable lower temperature limit that is equal to or less than about −150° C.

* * * * *